Nov. 15, 1960    R. WOOD    2,960,352
FIFTH WHEEL

Filed Sept. 29, 1959    2 Sheets-Sheet 1

INVENTOR.
ROBERT WOOD.
BY
HIS ATTORNEY.

Nov. 15, 1960

R. WOOD 2,960,352

FIFTH WHEEL

Filed Sept. 29, 1959

INVENTOR.
ROBERT WOOD.
BY
HIS ATTORNEY.

United States Patent Office 2,960,352
Patented Nov. 15, 1960

2,960,352

FIFTH WHEEL

Robert Wood, R.R. 3, Lebanon, Ohio

Filed Sept. 29, 1959, Ser. No. 843,145

3 Claims. (Cl. 280—433)

My invention relates to a mechanism for coupling a trailer to a tractor.

The coupling mechanism to which I am making reference in the description which follows is more generally known as a tractor fifth wheel.

The principal object of my invention is to provide a trailer coupler or trailer fifth wheel including a means for engaging the kingpin on the trailer, and means for holding the coupler in engagement with the kingpin.

Another object of my invention is to provide a coupling mechanism utilizing a kingpin whereby a minimum of lost motion between the kingpin and the coupling member is maintained.

Another object of my invention is to provide a coupling member adapted to surround a kingpin, said coupling member so adapted and constructed that a maximum amount of bearing surface is provided and also there is provided automatic constant adequate lubrication of the bearing surfaces.

In general, I accomplish the objects of my invention by the devices shown in the enclosed drawings, in which.

Figure 1:
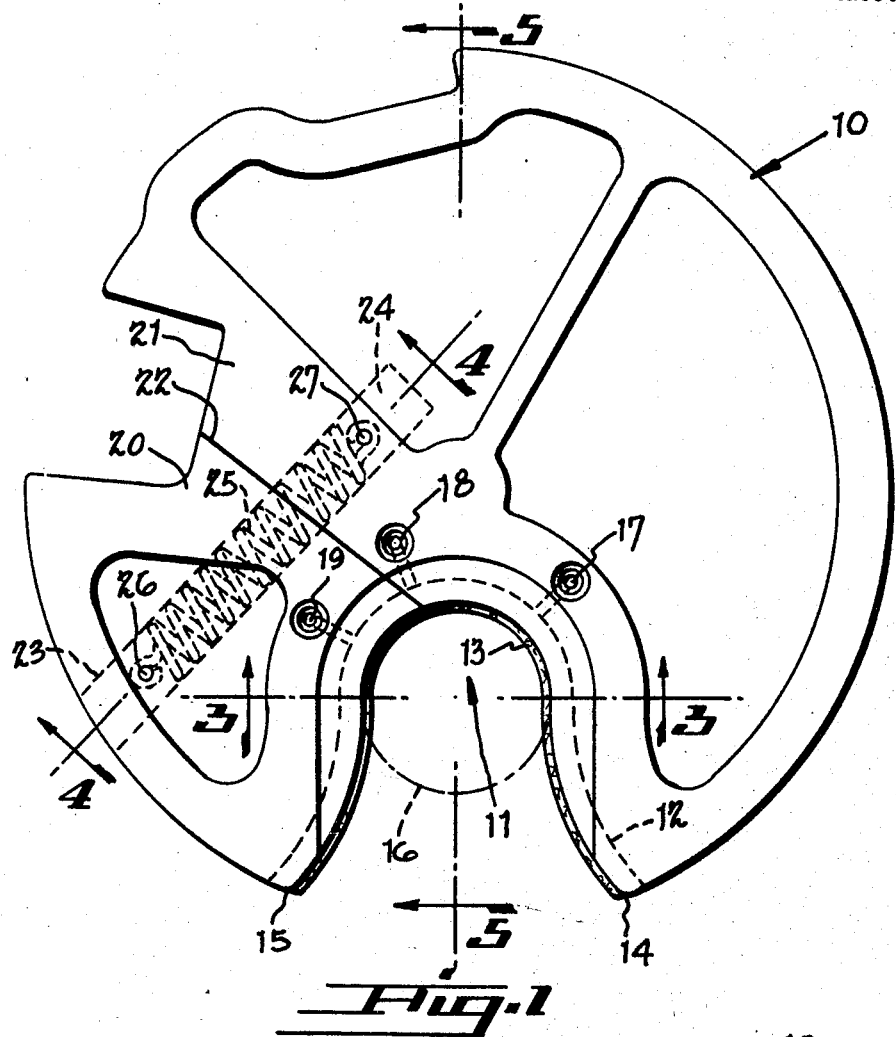
Figure 1 is a view in plan elevation of the coupling member of my invention.
Figure 2:
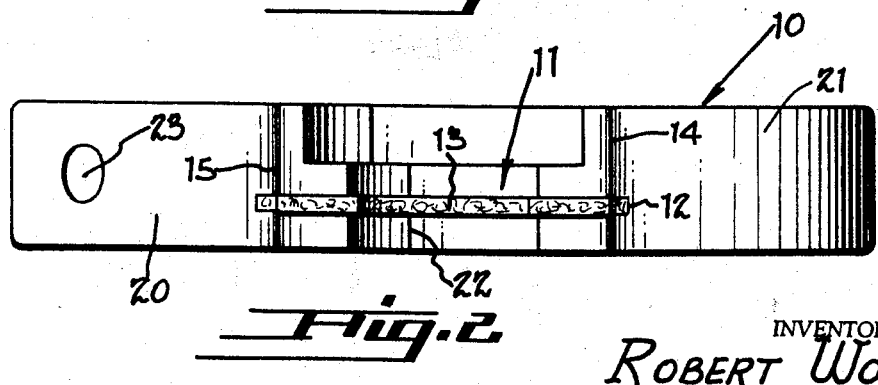
Figure 2 is a view in side elevation of the coupling member of my invention.

In general my invention comprises a coupling member which is split into two parts. A longitudinal opening is provided in each portion, said openings being in alignment and a spring is pinned within said openings so that the two portions of the split coupling member are joined together. The coupling member is also provided with an opening for receiving the kingpin, the coupling member around this opening is slotted so that felt or other lubricant retaining means may be placed therein to provide adequate constant lubrication between the kingpin and the coupling member.

In the drawings the reference numerals apply to the same parts in all the drawings and the arrows at the end of the section lines indicate the direction in which the sectional views are taken.

A coupling member 10 is attached to the trailer and constitutes the pad to receive what is known in the art as a fifth wheel member. This coupling member 10 is generally circular in structure, and is provided with an opening as at 11 for receiving a kingpin to firmly fasten the trailer to the tractor unit. The area for receiving the kingpin is provided with a groove 12 which is filled with padding or lubricant-carrying material such as indicated at 13. The groove 12 extends from the fore part 14 of the coupling member 10, up and around and ends at 15. This groove which is formed at 11 and which includes the groove 12 and the padding 13 and begins at 14 in Figure 1 and ends at 15, is adapted to receive a kingpin 16. The lubricant-carrying material 13 such as felt, with a lubricant such as heavy weight grease is supplied through ports 17, 18 and 19. In my invention I have so constructed the carrying member in relation to the groove 12 that the lubricant-carrying material 13, inserted within the groove, is adequately and continually supplied by injections of lubricant into ports 17, 18 and 19.

Prior to my invention it was necessary that grease or other material be applied to the kingpin in order that the proper operation be accomplished at every instance where a trailer unit was attached to a tractor unit by means of the kingpin. Often drivers or other employees would neglect to supply the lubricant thus causing unnecessary wear and tear and frequently this resulted in accidents due to play between kingpin and coupling member.

Since my invention it is not necessary to apply grease each time a kingpin is inserted or each time a trailer unit is attached to a tractor unit having a coupling member such as illustrated in Figure 1 of my invention. We thus avoid the forgetfulness of the operator of the tractor and trailer unit, and can rely upon the proper application of lubricants by mechanics in the shop after they inspect the units without any further effort upon the operators.

Figure 5:
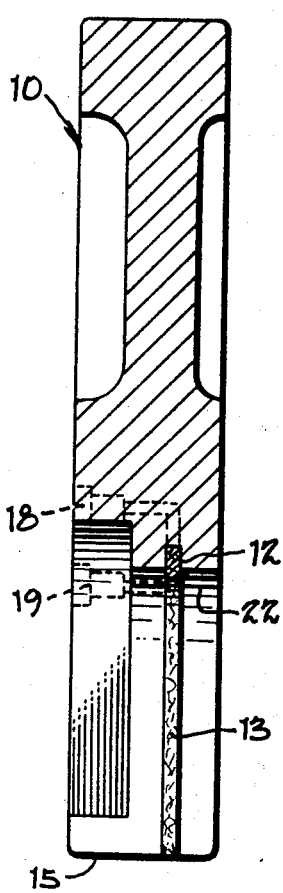
Figure 5 is a detailed, sectional view taken along the line 5—5 of Figure 1.

The operation of my self-lubricating device is further illustrated by reference to Figure 5 wherein the lubricant-carrying member 13 is illustrated being carried within a groove such as 12 and to which are attached the lubricant-supply couplings or members 18 and 19 in the structure 10. Members 18 and 19 are greased fittings to permit grease to travel into the groove in the felt retainer 13. The fittings are so constructed that grease may not back out of the fittings.

Figure 3:
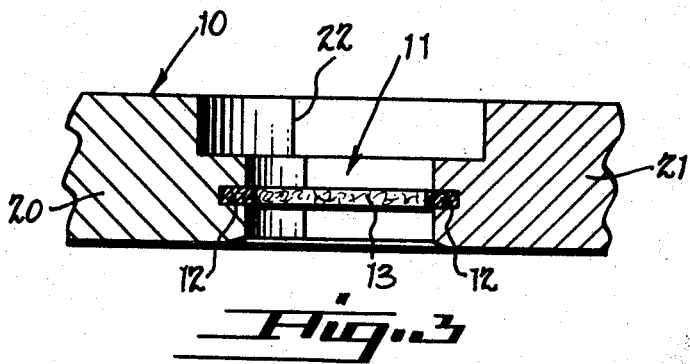
Figure 3 is a detailed, sectional view taken along the line 3—3 of Figure 1.

The portion of the carrying member 10 into which the fifth wheel 16 abuts, is illustrated in detail in Figure 3, wherein we show the groove 12 with the lubricant-carrying substance 13 securely placed therein.

In Figure 1 we show a means for automatically adjusting the carrying member 10 or coupler member 10 so that a secure and tight fit may be obtainable around the kingpin 16 without any adjustment or manipulation by the operator of the tractor-trailer unit.

In order to provide for self-adjustment or automatic adjustment of the coupling member around the kingpin 16, I have in my invention split the coupling member 10 into two portions 20 and 21, as indicated by the saw cut 22 shown in Figure 1. This provides for an automatic assumption into a locking position of the coupling member 10 around the kingpin 16. This also provides for self-adjustment due to misalignment. It also provides for automatic locking between the kingpin 16 and member 10 against the lubricant-carrying substance 13.

In order to accomplish this object of my invention I have bored a hole 23 in member 20, and bored an opening or a hole 24 into member 21 into which I have inserted a spring member 25.

Figure 4:
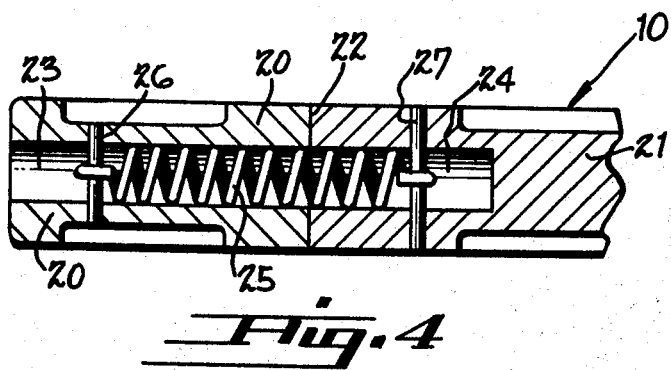
Figure 4 is a detailed, sectional view taken along the line 4—4 of Figure 1.

Referring to Figure 4 the opening 24 is shown in detail in the carriage 10, and the opening 23 is shown in detail in the portion 20 of the carrier 10. I provide posts 26 and 27 to which is secured the springs 25. In substance the spring 25 is drawn or draws together portions 20 and 21 of carrier 10 and tends by reason of the clearance allowed in saw cut 22 (a slot having a smaller diameter at one end formed by members 20 and 21 than if no clearance were provided) to force one or the other portion of the carrier 20 or 21 into and around the kingpin 16, thus providing for automatic adjustment of the carrier 10 around the kingpin 16. Spring 25 tends to pull portion 20 against portion 21 after the kingpin 16 has been inserted in the slot formed by portions 20 and 21. Kingpin 16 is larger than the slot described above.

The purposes of this invention are further served due to the lubricant-carrying member 13 which I have provided in the slot 11 which surrounds at least one-half of the kingpin as it is placed within the slot. It is therefore readily apparent that by my invention I have described a means whereby a kingpin of a trailer unit placed upon a tractor coupling member may be adequately and completely lubricated so as to prevent mishap, and further that by reason of the splitting of my coupling unit 10 into two members, an automatic locking is provided which locks the coupling member 10 against the kingpin 16.

Having thus described my invention, what I claim as new and useful and desire to secure by United States Letters Patent is:

1. In a trailer coupler, a fifth wheel mechanism comprising a pair of plates when joined having an opening terminating in a slot for receiving a kingpin, a spring member holding said plates in alignment about said kingpin and lubricating means surrounding said kingpin and carried in said plates.

2. In a trailer coupler, a fifth wheel mechanism comprising a pair of plates which when joined together have an opening terminating in a slot for receiving a kingpin, automatic lubricating means provided in said slot, resilient means secured at each end to one of said plates to form said slot according to the size of the kingpin received therein.

3. In a trailer coupler, a fifth wheel mechanism comprising a pair of plates forming when joined together by resilient means a substantially circular plate and having an opening terminating in a slot for receiving a kingpin, and lubricating means in said slot for continually lubricating said kingpin comprising felt padding in said slot and ports and channels in said plates for supplying lubricant to said padding.

References Cited in the file of this patent

UNITED STATES PATENTS

| | | |
|---|---|---|
| 2,093,761 | Kramer | Sept. 21, 1937 |
| 2,662,799 | Schaefer | Dec. 15, 1953 |
| 2,665,177 | Schaefer | Jan. 5, 1954 |
| 2,723,865 | Leoni | Nov. 15, 1955 |
| 2,878,047 | Booth | Mar. 17, 1959 |